United States Patent
Hosenfeldt et al.

(10) Patent No.: US 9,410,578 B2
(45) Date of Patent: Aug. 9, 2016

(54) ANTIFRICTION BEARING

(71) Applicant: Schaeffler Technologies GmbH & Co. KG, Herzogenaurach (DE)

(72) Inventors: Tim Matthias Hosenfeldt, Nuremberg (DE); Juergen Gierl, Erlangen (DE); Yashar Musayev, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/377,097

(22) PCT Filed: Jan. 22, 2013

(86) PCT No.: PCT/EP2013/051126
§ 371 (c)(1),
(2) Date: Aug. 6, 2014

(87) PCT Pub. No.: WO2013/120667
PCT Pub. Date: Aug. 22, 2013

(65) Prior Publication Data
US 2015/0010262 A1   Jan. 8, 2015

(30) Foreign Application Priority Data
Feb. 14, 2012 (DE) .......... 10 2012 202 155

(51) Int. Cl.
| | | |
|---|---|---|
| *F16C 19/50* | (2006.01) | |
| *F16C 33/34* | (2006.01) | |
| *F16C 33/58* | (2006.01) | |
| *F16C 33/62* | (2006.01) | |
| *F16C 19/24* | (2006.01) | |
| *F16C 19/46* | (2006.01) | |

(52) U.S. Cl.
CPC ............... *F16C 33/34* (2013.01); *F16C 19/24* (2013.01); *F16C 33/585* (2013.01); *F16C 33/62* (2013.01); *F16C 19/46* (2013.01); *F16C 2202/30* (2013.01); *F16C 2206/02* (2013.01); *F16C 2206/42* (2013.01); *F16C 2240/60* (2013.01)

(58) Field of Classification Search
CPC ........ F16C 19/24; F16C 19/26; F16C 19/525; F16C 33/34; F16C 33/36; F16C 33/583; F16C 33/585; F16C 33/62; F16C 2202/30; F16C 2206/02; F16C 2206/42; F16C 2206/44
See application file for complete search history.

(56) References Cited

U.S. PATENT DOCUMENTS

| | | | |
|---|---|---|---|
| 4,997,293 A * | 3/1991 | Ono et al. ..................... | 384/476 |
| 5,059,041 A | 10/1991 | Watanabe et al. | |
| 6,340,245 B1 * | 1/2002 | Horton et al. ................. | 384/492 |
| 6,828,041 B2 * | 12/2004 | Ueda ....................... | F16C 33/32 |
| | | | 384/206 |
| 7,503,697 B2 * | 3/2009 | Tsuji et al. ................... | 384/476 |

(Continued)

FOREIGN PATENT DOCUMENTS

| | | |
|---|---|---|
| CN | 101408225 | 4/2009 |
| CN | 101457791 | 6/2009 |

(Continued)

*Primary Examiner* — James Pilkington
(74) *Attorney, Agent, or Firm* — Davidson, Davidson & Kappel, LLC

(57) ABSTRACT

Anti-friction bearing, comprising a metallic outer ring and a metallic inner ring with respective rolling-body raceways, and a plurality of metallic rolling bodies which roll on said rolling-body raceways, wherein an electric insulation layer (11) is provided on the outer ring (2) and/or on the inner ring (3) on the raceway side and/or on the rolling bodies (4).

9 Claims, 1 Drawing Sheet

(56) References Cited

U.S. PATENT DOCUMENTS

| | | | |
|---|---|---|---|
| 2010/0086250 A1* | 4/2010 | Evans et al. | 384/571 |
| 2010/0215296 A1* | 8/2010 | Dahlman | F16C 33/64 384/51 |
| 2012/0008890 A1* | 1/2012 | Schwarz | F16C 33/62 384/476 |

FOREIGN PATENT DOCUMENTS

| | | |
|---|---|---|
| CN | 101730802 | 6/2010 |
| DE | 42 43 450 | 6/1994 |
| DE | 690 16 321 | 8/1995 |
| DE | 10 2008 024055 | 11/2009 |
| EP | 2048392 A2 | 4/2009 |

* cited by examiner

ANTIFRICTION BEARING

The present invention relates to an antifriction bearing, including a metallic outer ring and a metallic inner ring having particular rolling body raceways as well as multiple metallic rolling bodies which roll on these rolling body raceways.

BACKGROUND

Antifriction bearings of this type are used in a wide range of fields, including in current-conducting or current-generating applications, such as electric motors, where, for example, the rotor is supported on an antifriction bearing. In applications of this type, there is the risk of electrical continuity between the inner and outer rings, which results in damage to the antifriction bearing raceway and causes a reduction in the bearing life. While it is known to electrically insulate the bearing components by applying additional thick layers between the bearing seat and the outer ring, for which purpose a plastic insulation layer is applied to the outside of the bearing ring, for example according to DE 690 16 321 T2. Particularly with smaller bearing sizes, however, relatively considerable additional costs are associated therewith, measured on the basis of the required insulation class. Moreover, this insulation is used only for this purpose, and measures relating to improving the tribological property or the protection against wear must be additionally taken.

SUMMARY OF THE INVENTION

It is an object of the present invention to provide an antifriction bearing, which, on the one hand, is sufficiently insulated, but, on the other hand, is improved with regard to the tribological properties and/or wear protection.

The present invention provides that an electrical insulation layer is provided on the outer ring and/or on the inner ring on the raceway side and/or on the rolling bodies.

In the rolling body according to the present invention, the electrical insulation layer is particularly advantageously provided directly in the rolling area, and is thus also mechanically stressed. The insulation layer may be provided either on the raceway side on the outer ring and/or on the inner ring, the situation on only one of the rings being sufficient with regard to the insulation. This means that the inner circumferential surface on the outer ring or the outer circumferential surface on the inner ring is provided with an insulation layer of this type. Alternatively or additionally, the rolling bodies may also be covered with an insulation layer on the outside, which likewise ensures a sufficient electrical insulation, as, once again, the insulation layer in this case is itself stressed by rolling. Due to a corresponding design of the insulation layer or a corresponding selection of materials, tribological property improvements and/or a wear protection may furthermore be achieved with the aid of this insulation layer, after, as discussed, the insulation layer, in turn, is mechanically stressed during operation of the bearing.

For sufficient electrical insulation, the insulation layer should have a resistance of >200 MΩ; the higher the resistance, the better. In addition, the breakdown voltage at which a breakdown occurs should be at least 200 V.

According to one particularly advantageous refinement of the present invention, the insulation layer is made of an oxide ceramic, for example of $Al_2O_3$, $SiO_2$, $TiO_2$ or $ZrO_2$, this enumeration not being final. On the one hand, these oxide ceramics are excellent electrical insulators; on the other hand, they also demonstrate excellent mechanical properties, which are useful, in particular, for wear protection. These oxide ceramic layers may be particularly advantageously deposited from the gaseous phase, for example using PVD or PACVD methods, and may thus be applied in sufficiently thin layers and with high quality. In consequence of the gaseous phase deposition, in particular, good tribological properties may also be achieved with the aid of oxide ceramic layers of this type.

According to one refinement of the present invention, an adhesion-promoting layer may be provided between the metallic body of the outer ring, the inner ring and/or the rolling body as well as the insulation layer, which ensures a good bonding of the insulation layer, preferably of the described oxide ceramic layer.

A layer made of a metal, a metal carbide, a metal nitride, a metal boride or a metal silicide may be used as an adhesion-promoting layer of this type, the selection of the adhesion-promoting layer used being dependent, of course, on the insulation layer material to be applied, in particular the oxide ceramic to be applied.

In addition to the adhesion-promoting layer, if necessary a tribological cover layer covering the insulation layer may also be provided, which is furthermore used for setting the tribological properties. This cover layer may be a metalliferous, hydrogenous, amorphous carbon layer, a metal-free, hydrogenous, amorphous carbon layer or a modified, hydrogenous, amorphous carbon layer, this enumeration also not being final.

On the whole, therefore, the antifriction bearing according to the present invention may have a multi-layer laminate, including an adhesion-promoting layer, an insulation layer and a cover layer, so that, a layer system which is optimized with respect to the electrical insulation property, the tribological property and the wear resistance is provided directly in the stressed rolling area.

After the insulation layer is deposited, preferably from the gaseous phase, it is, of course, advantageous if the adhesion-promoting layer and the cover layer, if present, are also deposited from the gaseous phase, preferably using the same method, so that, if possible, a successive layering is possible in directly consecutive operations.

The layer thickness of the insulation layer should be ≤15 μm, in particular ≤10 μm, which is readily possible, in particular when forming an oxide ceramic layer, in particular from the gaseous phase. If the adhesion-promoting layer and/or the cover layer is/are additionally provided, the total layer thickness of the multilayer laminate should be ≤25 μm, in particular ≤20 μm.

BRIEF DESCRIPTION OF THE DRAWINGS

One exemplary embodiment of the invention is illustrated in the drawing and explained in greater detail below.

DETAILED DESCRIPTION

Figure 1:
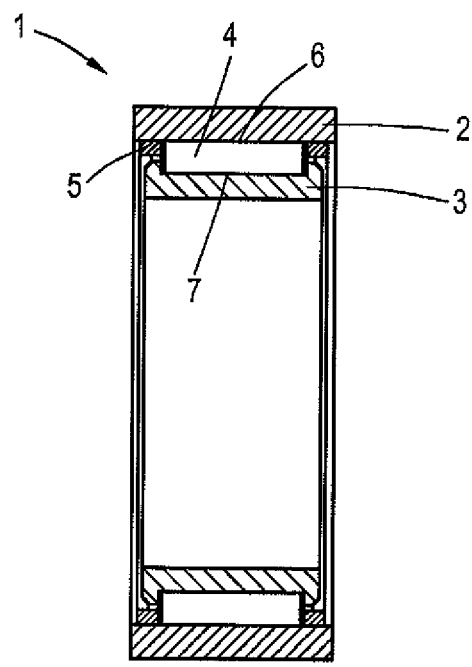
FIG. 1 shows a sectional view of an antifriction bearing according to the present invention.

FIG. 1 shows an antifriction bearing 1 according to the present invention in the form of a radial bearing, which includes an outer ring 2, an inner ring 3 and rolling bodies 4 situated therebetween, which are held in a cage 5. Outer ring 2 has a rolling body raceway 6 and inner ring has a rolling body raceway 7, on which rolling bodies 4 held in a cage 5 roll, in this case in the form of needles.

At least one of the two rolling body raceways 6, 7 and/or the outside of each rolling body 4 is provided with an electrical insulation layer, which prevents an electrical continuity from inner ring 3 to outer ring 2 or vice versa and thereby protects the bearing against damage by current flowing over the bearing. In the illustrated example, it is assumed that this electrical insulation layer is provided on rolling body raceway 6 of outer ring 2, as illustrated in an enlargement in FIG. 2.

Figure 2:
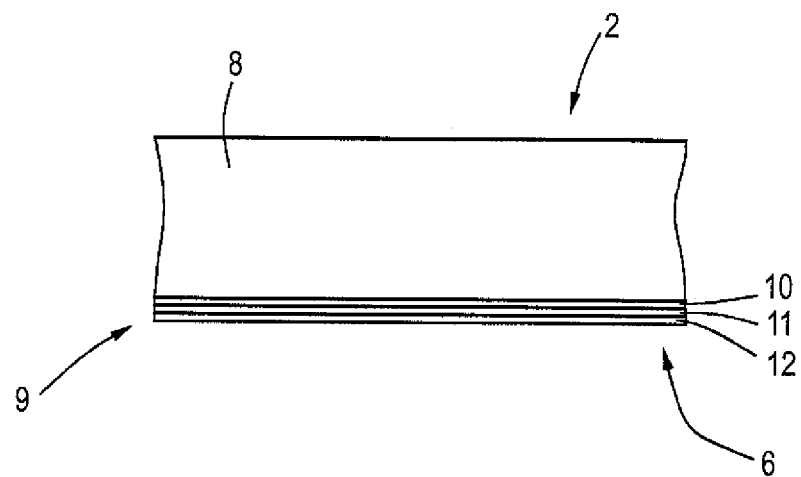
FIG. 2 shows an enlarged, partial sectional view of the outer ring, covered on the inside, of the antifriction bearing from FIG. 1.

FIG. 2 shows a partial sectional view of outer ring 2, which includes metallic body 8 of outer ring 2, as well as a multilayer layer system 9, which is applied or provided on the raceway side.

Illustrated layer system 9 includes an adhesion-promoting layer 10, which is applied directly to metallic body 8 of outer ring 2. The adhesion-promoting layer may be made of a metal, a metal carbide, a metal nitride, a metal boride or a metal silicide. The specific material selection depends on the material used for electrical insulation layer 11 applied to this adhesion-promoting layer 10. This electrical insulation layer 11 is extremely highly resistive and has an electrical resistance of >200 MΩ. The breakdown voltage should be at least 200 V. This layer is preferably an oxide ceramic layer, for example made of $Al_2O_3$, $SiO_2$, $TiO_2$ or $ZrO_2$, this enumeration not being final. Electrical insulation layer 11 may, of course, also be a multilayer layer, which may include multiple layers of different ones of the aforementioned oxide ceramic materials. Due to electrical insulation layer 11, antifriction bearing 1 is insulated, viewed in the radial direction, so that no continuity occurs over the bearing.

Electrical insulation layer 11, in turn, is covered with a tribological cover layer 12, for example made of a metalliferous, hydrogenous, amorphous carbon layer (a-C:H:Me), a metal-free, hydrogenous, amorphous carbon layer (a-C:H) or a modified, hydrogenous, amorphous carbon layer (a-C:H), it also being possible for this cover layer to be a mixed layer or a multi-layer layer, including two or multiple of these aforementioned materials. This enumeration is also not final.

Entire layer system 9 is subjected to rolling stress, i.e., rolling bodies 4 roll directly on this layer system 9. The tribological properties of layer system 9, which directly affect the rolling performance of rolling bodies 4, are set with the aid of tribological cover layer 12. Electrical insulation layer 11 implements the current insulation, as described, while adhesion-promoting layer 10 results in a strong bonding of the cover layer system to metallic body 8 of the outer ring.

The overall layer thickness of layer system 9 should be ≤25 μm, preferably ≤20 μm, the insulation layer 11 not being thicker than 15 μm, preferably ≤10 μm.

Insulation layer 11 is preferably deposited from the gaseous phase. The same applies, if possible, to adhesion-promoting layer 10 or cover layer 12, as long as this is permitted by the specific layer materials used.

Although FIG. 2 describes the arrangement of layer system 9 on outer ring 2, it is, of course, conceivable to also provide this layer system alternatively or additionally on the metallic body of inner ring 3, i.e., on its raceway 7. Of course, both outer ring 2 and inner ring 3 may be covered with a layer system of this type.

Alternatively or additionally, rolling bodies 4, i.e., the needles, may also be covered with this layer system 9 on the outside. This is also advantageous with regard to the insulation properties, the tribological properties as well as the wear resistance to be achieved.

Although FIG. 2 shows the embodiment of a layer system 9, including the three layers described, it is, of course, also possible to apply, for example, only insulation layer 11 and therefore deposit it directly on the metallic body of the particular component. On the one hand, the excellent insulation is provided thereby, on the other hand, of course, an extremely high wear resistance as well as good tribological properties may be achieved with the aid of the insulation layer, for example in the form of the oxide ceramic layer. In this case, only one single-layer system would be provided. The provision of a two-layer system is also conceivable, for example by additionally depositing adhesion-promoting layer 10 or tribological cover layer 12. Whether a single-layer system, a two-layer system or a three-layer system is provided ultimately depends on the specific application of antifriction bearing 1.

Although FIG. 1 shows a radial bearing, it is, of course, also conceivable to design the antifriction bearing as an axial bearing. Moreover, the present invention is, of course, not limited to a needle bearing; instead, any type of antifriction bearing may ultimately be provided according to the present invention.

LIST OF REFERENCE NUMERALS

1 Antifriction bearing
2 Outer ring
3 Inner ring
4 Rolling body
5 Cage
6 Rolling body raceway
7 Rolling body raceway
8 Metallic body
9 Layer system
10 Adhesion-promoting layer
11 Insulation layer
12 Cover layer

What is claimed is:

1. An antifriction bearing comprising:
a metallic outer ring and a metallic inner ring having rolling body raceways, the metallic outer ring being electrically insulated from the metallic inner ring;
a plurality of metallic rolling bodies capable of rolling on the rolling body raceways;
an electrical insulation layer provided on the outer ring or on the inner ring on the raceway side, or on the rolling bodies, wherein the insulation layer is made of an oxide ceramic; and
an adhesion-promoting layer between a metallic body of the outer ring or of the inner ring or the rolling body and the insulation layer, wherein the adhesion-promoting layer is made of a metal carbide, a metal nitride, a metal boride or a metal silicide.

2. The antifriction bearing as recited in claim 1 wherein the insulation layer has a resistance of >200 MΩ.

3. The antifriction bearing as recited in claim 1 wherein the insulation layer is made of $Al_2O_3$, $SiO_2$, $TiO_2$ or $ZrO_2$.

4. The antifriction bearing as recited in claim 1 further comprising a tribological cover layer covering the insulation layer.

5. The antifriction bearing as recited in claim 4 wherein the cover layer is a metalliferous, hydrogenous, amorphous carbon layer, a metal-free, hydrogenous, amorphous carbon layer or a modified, hydrogenous, amorphous carbon layer.

6. The antifriction bearing as recited in claim 1 wherein the layer thickness of the insulation layer is ≤15 μm.

7. The antifriction bearing as recited in claim 1 wherein the layer thickness of the insulation layer (11) is ≤10 μm.

8. The antifriction bearing as recited in claim 1 wherein at least one of the insulation layer and the adhesion-promoting layer is manufactured using a PVD or PACVD method.

9. The antifriction bearing as recited in claim 1 wherein the rolling bodies are needles.

\* \* \* \* \*